INVENTORS
JOHN R. SIZELOVE
JOHN A. LOVE, III
BY Harry A. Herbert Jr
Robert Kern Duncan
ATTORNEYS

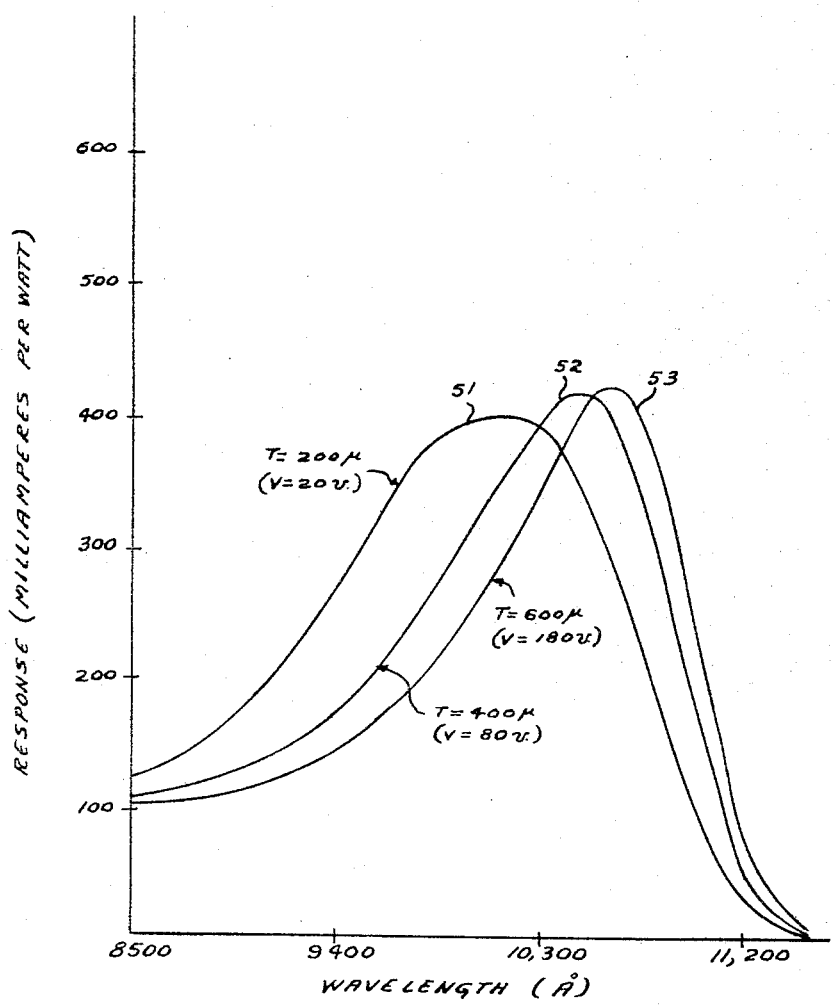
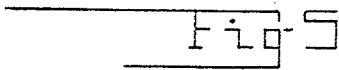

United States Patent Office 3,435,236
Patented Mar. 25, 1969

3,435,236
HIGH OHMIC SEMICONDUCTOR TUNED NARROW BANDPASS BARRIER PHOTODIODE
John A. Love III, and John R. Sizelove, Dayton, Ohio, assignors to the United States of America as represented by the Secretary of the Air Force
Filed Mar. 21, 1967, Ser. No. 625,564
Int. Cl. H01j *39/12;* H01l *15/00*
U.S. Cl. 250—211          5 Claims

ABSTRACT OF THE DISCLOSURE

A high ohmic semiconductor barrier photodiode with a geometrical configuration wherein light enters the diode opposite the rectifying contact and through bulk absorption-recombination action the photodiode has a narrow bandpass spectral response.

Dedication

The invention described herein may be manufactured and used by or for the United States Government for governmental purposes without the payment to us of any royalty thereon.

Background of the invention

The field of this invention is optical receivers and detectors that provide an electrical output in response to impinging light waves, and more particularly, high ohmic, barrier photodiode light receivers that have a narrow spectral response, utilizing the Schottky phootdiode effect.

In a light detector for detecting a frequency or a relatively narrow band of frequencies it is highly desirable to limit the spectral noise response of the detector in order to improve the signal-to-noise ratio.

Prior art, high ohmic, photodiode optical detection systems utilize cumbersome attenuating optical filters to suppress wide band optical background noise from impinging on the optical receiver.

Summary of the invention

A high-ohmic reverse-biased barrier photodiode is disclosed that has the unique characteristics of limited spectral response through the minority carrier bulk recombination action. The spectral response is a function of the extent of the majority-carrier depleted region in the semiconductor photodiode material, the thickness of the absorbing region, and the minority carrier's mean recombination path length. Narrow spectral response exists in high ohmic semiconductor materials in which the minority carrier's recombination length is shorter than the thickness of the material and over the region wherein the absorption coefficient α of the material is rapidly changing.

It is an object of the invention to provide a high ohmic, barrier photodiode having a narrow spectral response.

It is another object of this invention to provide a high ohmic, barrier, photodiode having a narrow spectral response tuned to a determined center response wavelength.

It is another object of this invention to provide a high ohmic, barrier, photodiode having a narrow spectral response voltage tunable to a determined center response wavelength.

It is another object of this invention to provide an optical receiver having an improved signal-to-noise ratio.

It is another object of this invention to provide an improved detector for optical radar receivers.

It is another object of this invention to provide an improved detector for laser communication receivers.

These and other objects, such as feedback control circuits using optical detectors, will become more apparent and the invention will be more readily understood from a consideration of the following drawing and the detailed description.

Brief description of the drawing

FIG. 5 is a graph showing the voltage-thickness tuning bandpass characteristics of three preferred embodiments of the invention.

Description of preferred embodiments

Figure 1:
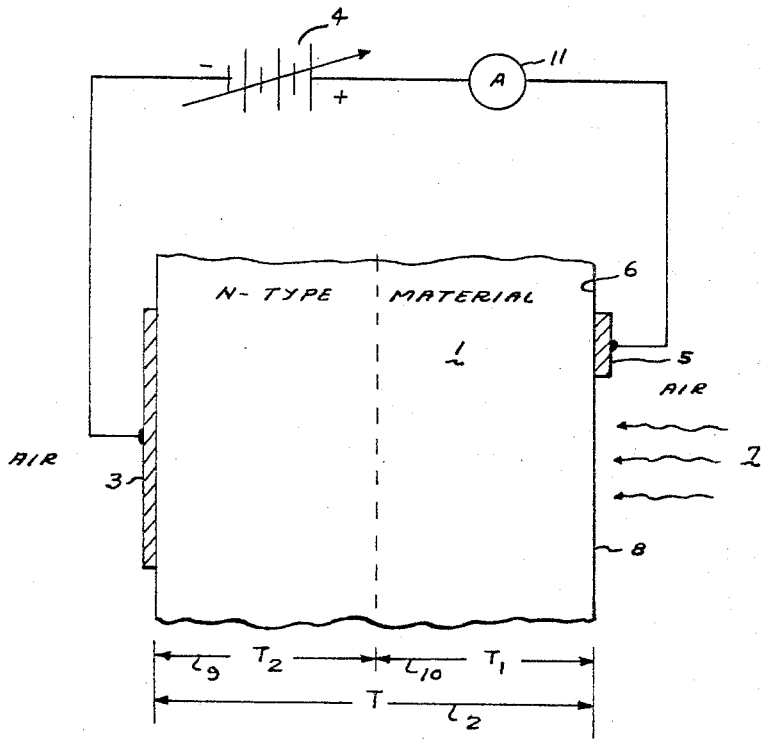
FIG. 1 is a schematic symbolic representation of an embodiment of a high ohmic, barrier, photodiode having a tuned narrow spectral response.

Referring to FIG. 1, the semiconductor element 1 may be a single crystal of high ohmic material of either N type or P type material. Such materials have typical values in the thousands of ohm centimeters, such as 2000 ohm-cm., for the high ohmic materials and values below one hundred, such as 20 ohm-cm., for the low ohmic materials. With the electrical polarities as shown, an N type material is used. The thickness 2 of the element 1 is represented as shown by T. The rectifying contact 3, which may be a conventional gold contact, is connected to the negative side of the voltage potential 4. It is desirable that the rectifying contact essentially cover the one face of the semiconductor element and be of such a density as to be essentially totally reflective to light. The ohmic contact 5, which may be a conventional tin alloy contact, is positioned on the opposite face 6 of the element from the rectifying contact. It is connected to the positive side of the potential source 4. It is desirable to make the ohmic contact relatively small compared to the face of the semiconductor element so that the light waves 7 may be readily admitted to and impinge essentially unobstructed on the ohmic side of the element. It is desirable to place a conventional nonreflective, impedance matching, optical coating 8 over the face of the crystal constituting the aperture for the admission of the light waves. A loss in efficiency of approximately 30 percent will result if such a coating is not used.

Figure 2:
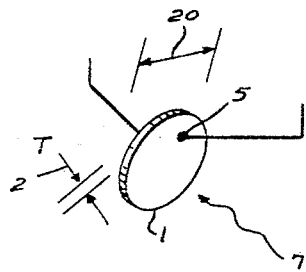
FIG. 2 is a pictorial view of the device shown symbolically in FIG. 1.
Figure 3:
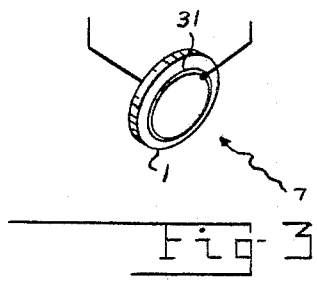
FIG. 3 is a pictorial view of an embodiment having an annulus ohmic contact.

A pictorial view of the embodiment symbolically represented in FIG. 1 is shown in FIG. 2. The element 1 may be a circular wafer a few thousandths of an inch thick with a typical diameter 20 a fraction of an inch. The diameter of cross sectional configuration is not critical and may be modified to suit the application in which the invention is used. Instead of being a small spot on the crystal face, the ohmic contact may be an annulus contact 31 (FIG. 3) on the crystal face with the light energy entering the semiconductor element 1 through the open center of the annulus.

In order to further set forth the fabrication and operation of this invention, the following definitions, constants, symbols and physical parameters should be considered:

(a) The semiconductor 1 is fabricated (or cleaved) from a crystal having known absorption characteristics. Tables and curves of the wave-length-dependent absorption coefficient, α, plotted against wave length or frequency, are readily available and are well known in the art.

(b) The semiconductor element has an overall thickness 2 represented by T.

(c) A majority carrier depleted region is formed within the semiconductor element over a portion 9, represented by $T_2$, of the total element thickness, and drift recombination takes place in this region as the controlling factor; this is the high field region of the crystal element.

(d) Diffusion recombination takes place as a controlling factor in the remainder of the crystal element 10, represented by $T_1$; this is the zero field (essentially) region of the element;

(e) The resistivity $\rho$ in ohm centimeters is determined by the composition of the semiconductor material. Materials are readily available having determined values of resistivity;

(f) The mobility factor $\mu_m$, of the minority carrier is a determinable and known factor of the material. Semiconductor materials are readily available having relatively wide ranges of mobility factors, a typical value being 50 cm.²/volt-seconds.

(g) The mean free time for the hole-electron bulk recombination, $\tau$, is a determined and known factor. Semiconductor materials may be readily obtained having specific values of $\tau$, a typical value being 20 microseconds.

(h) The bulk diffusion recombination path length $l_1$ for the semiconductor material at room temperature taking place over the recombination thickness $T_1$ is approximately defined by $l_1 = \sqrt{.025 \mu_m \tau}$.

(i) The recombination drift path length $l_2$ for the depleted region $T_2$ is defined approximately by $$l_1 = \mu_m \tau \frac{V}{T_2}$$

where V is the reverse or back bias potential (4, FIG. 1) impressed across the diodee and (j) The thickness (or depth) of the depleted region $T_2$ is expressed (in microns) as $T_2 \approx \frac{1}{2}\sqrt{\rho V}$ where $\rho$ is in ohm-centimeters and V is in volts.

Figure 4:
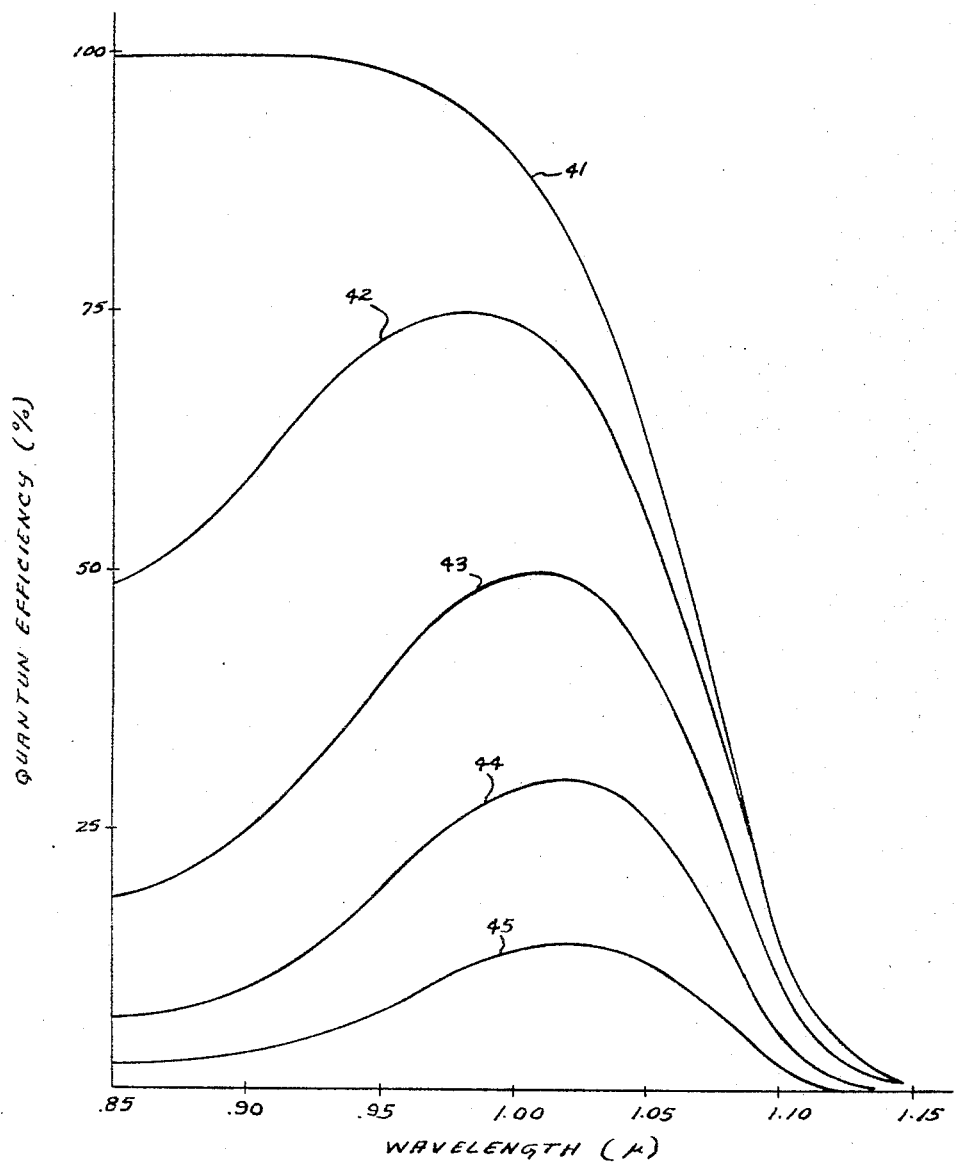
FIG. 4 is a graph showing response characteristics of a silicon high ohmic photodiode having the same overall thicknesses, the same diffusion recombination lengths, but various extents of drift recombination lengths and different depletion depths.

FIG. 4 is a plot of the characteristics of a photo-diode wafer of silicon having an overall thickness T of 200 microns and an inherent diffusion recombination path length in the (undepleted) material of 50 microns. By varying the back bias voltage on the device, various depths (thicknesses) of the depletion region $T_2$ are obtained with their various associated recombination drift lengths $l_2$. The curves then depict how the pass bandwidths, the center wavelengths, and the quantum efficiencies change. The particular element represented by these curves is constructed from silicon semiconductor material having a coefficient of resistivity, $\rho$, of 2000 ohm-cm.

Curve 41 is a curve of a barrier photodiode operated in the conventional manner. It is characterized by high quantum efficiency, broad bandwidth, and without a tuned center frequency. The device is fully depleted, i.e., $T_2$, is equal to 200 microns, the full thickness T of the crystal element. The back bias voltage, V, is approximately 80 volts and the recombination drift length $l_2$ is approximately $4 \cdot 10^4$ microns.

Curve 42 is of the same element operated with approximately 45 volts of bias making $T_2$ approximately $150\mu$ and $l_2$ approximately $3 \cdot 10^4 \mu$. It is to be observed that the quantum efficiency has decreased to approximately 75 percent, and the device now has a definite center wave length and bandpass characteristics.

Curve 43 is of the same element operated with 20 volts of back bias making $T_2$ approximately $100\mu$ and $l_2$ approximately $2 \cdot 10^4 \mu$. The quantum efficiency is approximately 50 percent, the center wave length about $1.01\mu$, and the band width at the 3db down points is approximately $1.3\mu$. This curve represents the characteristics of a preferred embodiment of this invention fabricated and operated for optimum quantum efficiency and narrow bandwidth. This embodiment is delineated numerically by the following parameters:

$$T/l_1 = \frac{T_1 + T_2}{l_1} \approx 2$$

$$T_1 \approx T_2$$

(i.e., the element is approximately ½ depleted)

$$\alpha T_1 \left(1 + \frac{T_2}{T_1 + T_2}\right) \approx 1.2$$

or $$\alpha T \approx 1.6$$

$$T_2 \approx \sqrt{\rho V/2}$$

The quantum efficiency, Y, is determined by:

$$Y \approx \frac{\alpha l_1 e^{-T_2/l_2}}{1 - \alpha l_1}(e^{-\alpha T_1} - e^{-T_1/l_1}) + \frac{\alpha l_2}{1 - \alpha l_2} e^{-\alpha T_1}(e^{-\alpha T_2} - e^{-(T_2/l_2)})$$

where $e$ is the Naperian logarithm base.

In the characteristic exemplified by curve 44 the back bias voltage impressed across the element has been decreased to 5 volts, thus making $T_2$ approximately $50\mu$ and $l_2$ approximately $10^4 \mu$. The semiconductor crystal is now one-fourth depleted, and the efficiency has dropped to approximately 30 percent.

The curve 45 was obtained with zero bias voltage (essentially). Thus the element has negligible (approximately 2 microns) depletion depth and band width narrowing was by bulk recombination alone. Minority carrier generation in the negligible depletion, or high-field, region is insignificant compared to minority carrier generation in the zero-field region. The efficiencies obtained by the operation depicted by these last two curves, i.e., 44 and 45, are considered too low for high ohmic devices to be preferred embodiments of the invention.

FIG. 5 shows the response characteristics of three different illustrative embodiments of this invention, fabricated, and operated as taught herein. The semiconductor material is silicon. The element thicknesses, T, and the inherent diffusion recombination path length $l_1$, are different for each, but the $T/l_1$ ratios all have the same approximate value of 4. The depletion thicknesses $T_2$ in each are one-half the total thickness T. The $\alpha T$ product for each device is approximately 1.6. The mobility constants $\mu_m$ are approximately 50 cm.²/volt-seconds. $\tau$ is approximately 20 microseconds, and the quantum efficiencies are approximately 50 percent for all three. The bias voltages, V, are necessarily different. Each device has approximately the same bandpass characteristics, but the center wave lengths are different, that is each is tuned to a different portion of the spectrum. It is to be observed that curve 51 is of the same embodiment constructed and operated in the same manner as shown by curve 43 of FIG. 4, hence the characteristics shown by the two curves are essentially identical.

As taught herein a tuned narrow band pass barrier photodiode may be fabricated from high ohmic semiconductor material by determining the value of $\alpha$ at the desired tuned center frequency from the standard coefficient of absorption curves for the semiconductor material that is to be used. From this value of $\alpha$ the thickness T of the semiconductor crystal element may be determined such that $T \approx 1.6/\alpha$. Knowing T and the factor that $T/l_1$, should equal approximately 4 the recombination length $l_1$ is determined. Knowing $l_1$ the $\mu_m \tau$ product may be determined and semiconductor material having a mobility factor $\mu_m$ and a recombination time $\tau$ to produce the product obtained ($l_1 \approx \sqrt{.025 \mu_m \tau}$, at room temperature). Since T has been determined and it has been shown that $T_2$ equals one-half of T, the bias voltage, V, may be determined from the expression $T_2 \approx \frac{1}{2}\sqrt{\rho V}$, thus the required bias voltage for the device may be determined, knowing the depletion thickness and the coefficient of resistance, $\rho$, of the material. Using this approach with the previously given information the device in accordance with FIG. 1 may be constructed.

At the expense of a departure from optimum operation, the center frequency (or wave length) of a specific operating embodiment may be shifted by merely changing the bias voltage small amounts. This may be very desirable when a given photodiode detector is used to receive energy from a radiating device that is emitting a very narrow band width at a fixed center frequency.

It has been found that in the use of a N-doped, silicon semiconductor, barrier photodiode, fabricated and operated to have the characteristics exemplified by the curve 43 of FIG. 4 and 51 of FIG. 5, that plus and minus changes of 50 percent in the bias voltage produce a center wavelength shift of plus and minus approximately 100 A. This is considered the maximum amount of shift feasible due to the changes in efficiencies encountered.

Detailed descriptions of embodiments of photodiodes fabricated from high ohmic silicon semiconductor materials that have a relatively narrow spectral response and that may be tuned to a specific center frequency have been set forth. It is to be understood that the teachings herein apply equally well to other high ohmic semiconductor materials such as gallium arsenide, and that the material may be either P-type or N-type. Also sufficient teaching has been included to enable those skilled in the art to make many modifications in the fabrication and operation of the devices to suit particular applications that depart from the generally preferred embodiments which are approximately fifty percent depleted, have quantum efficiencies of approximately fifty percent, have thickness to recombination path length ratios of approximately four, and absorption coefficient thickness products of approximately 1.6 at the center frequency.

We claim:

1. A narrow spectral response barrier photodiode tuned to a define center wave length for detecting light energy comprising:
   (a) an element of high ohmic semiconductor material having a defined coefficient of absorption and a defined electron-hole bulk diffusion recombination path length, and having a first face and a second face and a determined thickness defined therebetween such that the product of the said element thickness and the coefficient of absorption of the said element at the said defined center wavelength is approximately 1.6, and the said element being fabricated from semiconductor material having a bulk diffusion recombination path length such that the ratio of the said element thickness to the said bulk recombination path length is approximately four;
   (b) a first electrical contact means cooperating with the said first face for providing a rectifying contact;
   (c) a second electrical contact means cooperating with the said second face for providing an ohmic contact;
   (d) means for admitting light to the said second face;
   (e) electrical potential means cooperating with the said first and the said second contact means, back biasing the said photodiode and providing a depletion region extending from the said rectifying contact approximately one-half the said thickness of the said photodiode element; and
   (f) means cooperating with the said potential means for indicating the electrical current flowing between the said first contact and the said second contact.

2. A barrier photodiode, having a rectifying contact and an ohmic contact, for detecting light energy, fabricated from a single crystal of high ohmic semiconductor material having a defined coefficient of absorption characteristic, a defined electron-hole bulk diffusion recombination path length, and a defined coefficient of resistance, to provide a photodiode having a narrow spectral response at a determined center wave length, the said photodiode comprising:
   (a) a wafer of the said semiconductor material having a first face and a second face in essentially a parallel relationship defining a determined thickness therebetween wherein:
      (1) the said determined thickness is approximately four times the said diffusion recombination path length; and
      (2) the product of the said thickness and the said coefficient of absorption, at the said center wave length, is approximately 1.6;
   (b) voltage potential means cooperating with the said rectifying contact and the said ohmic contact for back biasing the said photodiode and forming a depleted region in the said semiconductor element, the magnitude of the said voltage potential in volts being approximately equal numerically to the quotient of the square of the said element thickness in microns divided by the said coefficient of resistance in ohm centimeters; and
   (c) current indicating means cooperating with the said voltage potential means for indicating the flow of current through the said photodiode.

3. A system having a narrow spectral response tuned to a defined wavelength for detecting light energy comprising:
   (a) a photodiode element fabricated from a single crystal of high ohmic semiconductor material, the said material having the defined parameters of, a wavelength dependent coefficient of absorption, $\alpha$, a coefficient of resitance, $\rho$, and an electron-hole diffusion recombination path length $l_1$, wherein:
      (1) the said element has a first face and a second face defining a determined thickness, T, therebetween;
      (2) the product of the said determined thickness, T, and the said coefficient of absorption, $\alpha$, at the said defined wavelength is numerically expressed by $\alpha T \approx 2$;
      (3) the quotient of the said determined thickness, T, divided by said recombination path length $l_1$, is numerically expressed by $T/l_1 = 4$;
   (b) a first electrical contact means cooperating with the said first face for providing a rectifying contact;
   (c) a second electrical contact means cooperating with the said second face for providing an ohmic contact;
   (d) optical coating means cooperating with the said second face for admitting essentially undiminished light energy to the said element;
   (e) voltage potential means, V, cooperating with the said first and the said second electrical contact means for back biasing the said element and forming a majority carrier depletion region wherein, the potential of the said voltage in volts is approximately equally numerically to the square of the said element thickness, T, in microns divided by the said coefficient of resistance, $\rho$, in ohm centimeters, as expressed by $V \approx T^2/\rho$; and
   (f) current indicating means cooperating with the said voltage potential means and the said first and second electrical contact means for indicating the current flowing through the said photodiode whereby the said light energy is detected.

4. In a light receiving system having a barrier photodiode fabricated to a defined thickness between a first face and a second face from high ohmic semiconductor material with a rectifying electrical contact on the first face, and an ohmic electrical contact on the second face, the said semiconductor material having a defined coefficient of absorption and a defined electron-hole recombination path length, a reverse bias voltage impressed through the said electrical contacts between the first face and the second face, current indicating means cooperating with the said bias voltage indicating the flow of current through the said semiconductor, and light admitting means, the said light receiving system for providing a narrow spectral response at a tuned wavelength, and comprising:
  (a) the said fabricated thickness and the coefficient of absorption at the said tuned wavelength having a numerical product value between one and two;
  (b) the said fabrication thickness and diffusion recombination path length having a numerical ratio be-between three and five;
  (c) the said reverse bias voltage being of such magnitude that the said photodiode is depleted approximately one-half the said defined thickness; and
  (d) the said light admitting means being positioned on the said second face.

5. A light receiving system having a narrow spectral response turnable about a defined wavelength, having a barrier photodiode fabricated to a defined thickness between a first face and a second face from high ohmic semiconductor material with a rectifying electrical contact on the first face, and an ohmic electrical contact on the second face, a reverse bias voltage between the first face and the second face, current indicating means cooperating with the said bias voltage indicating the flow of current through the said semiconductor, and light admitting means, the said semiconductor material having a defined coefficient of absorption, and a defined electron-hole recombination path length, the said system comprising:
  (a) the said fabricated thickness and the coefficient of absorption, at the said defined wavelength, having a numerical product value between one and two;
  (b) the said fabrication thickness and diffusion recombination path length having a numerical ratio between three and five;
  (c) means cooperating with the said reverse bias voltage for varying the magnitude of the said bias voltage through a range of less than approximately plus and minus fifty percent of that magnitude at which the said photodiode is depleted approximately one-half the said defined thickness; and
  (d) the said light admitting means being positioned on the said second face.

References Cited

UNITED STATES PATENTS

| | | |
|---|---|---|
| 2,692,950 | 10/1954 | Wallace. |
| 3,049,622 | 8/1962 | Ahlstrom et al. |
| 3,146,138 | 8/1964 | Shirland. |
| 3,210,622 | 10/1965 | Gradus. |

OTHER REFERENCES

Conley et al: Tunneling Spectroscopy in GaAs, Physical Review, vol. 161, No. 3, Sept. 15, 1967, pp. 681–695.

M. V. Schneider: Schottky Barrier Photodiodes with Antireflection Coating, Bell System Technical Journal, November 1966, pp. 1611–1638.

RALPH G. NILSON, *Primary Examiner.*

B. L. ADAMS, *Assistant Examiner.*

U.S. Cl X.R.

317—235